Figure 1:
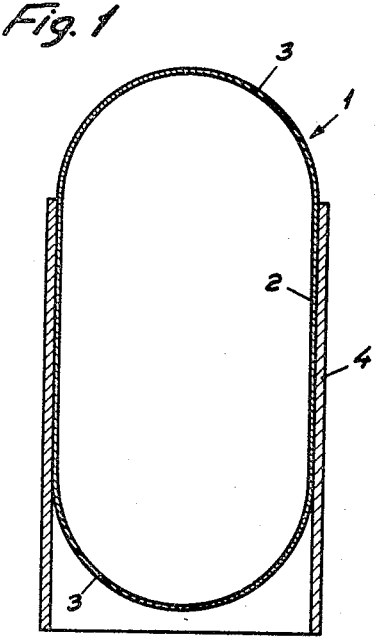

June 13, 1967  A. R. RAUSING ETAL  3,325,030

BOTTLE CONTAINING A FLUENT MATERIAL UNDER PRESSURE

Filed July 9, 1965  2 Sheets-Sheet 1

United States Patent Office 3,325,030
Patented June 13, 1967

3,325,030
BOTTLE CONTAINING A FLUENT MATERIAL UNDER PRESSURE
Anders Ruben Rausing, Simontorps Sateri, Sjobo, Sweden, and Rolf Lennart Ignell, Lund, Sweden; said Ignell assignor to said Rausing
Filed July 9, 1965, Ser. No. 470,700
Claims priority, application Switzerland, July 20, 1964, 9,488/64
3 Claims. (Cl. 215—12)

This invention refers to a bottle for a filling material under internal pressure consisting of a liquid and gas which is at least partially dissolved in the liquid, such as beer and other carbonated beverages.

During recent years the use of glass bottles for the distribution of beer and lemonades has proved to be more and more of a burden both for the breweries and for the trade on account of the work involved in the return transport and washing of empty bottles for the reuse thereof. Therefore, new expedients have been sought to enable the use of non-return containers for the distribution of beer and lemonades, but no quite satisfactory solution has yet been found. It would seem natural to suggest that bottles for beer and lemonades could be made from some suitable type of plastic, but in practice there have been great obstacles to a realization of any possible schemes to that effect. These obstacles consist, inter alia, in the fact that such plastics as would be suitable from certain points of view, e.g. stiff, impact resistant polyvinyl chloride which has great tensile strength and is accepted for storing foods, have unsatisfactory qualities in other respects. Polyvinyl chloride, for instance, has a certain permeability to gases and therefore probably would not be suitable where more than quite a short time of storage of beer and lemonades with carbonic acid under pressure is desired. Besides this, at present it commands too high a price. These two qualities of the polyvinyl chloride mentioned as an example are besides mutually conflicting inasmuch as an attempt at reducing the cost of raw material for bottles of polyvinyl chloride by making them of smaller wall thickness would cause an increased rate of passage of carbonic acid. Another obstacle to the use of e.g. polyvinyl chloride in bottles for liquids under internal pressure is that in the case of conventional shapes of bottles, which traditionally are determined inter alia by the requirement that the bottles have to be able to stand fairly steadily for themselves, the wall thickness of the bottles as a whole must be accommodated to the critical region where the material strains owing to the internal pressure become greatest. In the case of cylindrical bottles with flat (or re-entrant) bottom, for instance, this region is at the periphery of the latter. Thereby the consumption of materials and with it also the cost of materials will be higher than would be required with regard to the mechanical strength.

The object to be achieved by the invention is to provide a bottle of plastic intended for beer and other carbonated beverages, in which the abovementioned disadvantages are avoided. This bottle is characterized by the fact that it comprises a container of a plastic which is impermeable to the filling material and having a shell and two bulged end walls closing the ends of said shell, the container having a substantially uniform wall thickness determined with regard to the tensional stress in the end walls arising from the internal overpressure in the bottle, and a supporting sleeve made from a stiff and mechanically resistant material, e.g. cardboard, placed around the container with a close fit for stiffening the shell of the container, the supporting sleeve at one end extending slightly beyond the adjacent bulged end wall of the container so as to function also as a foot for the bottle.

Figure 2:
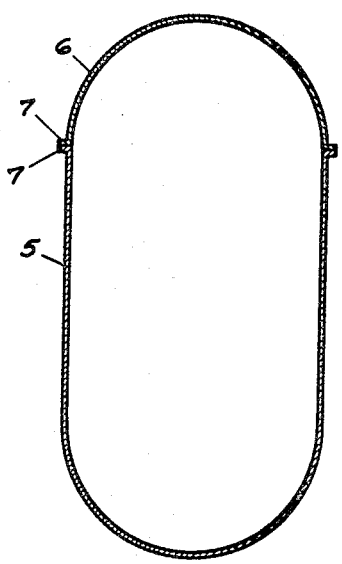
Figure 3:
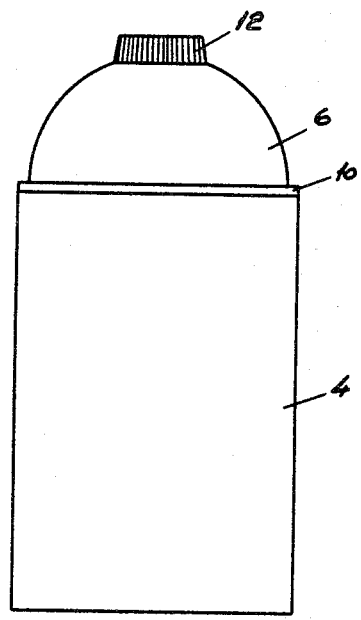
Figures 2A, 2B:
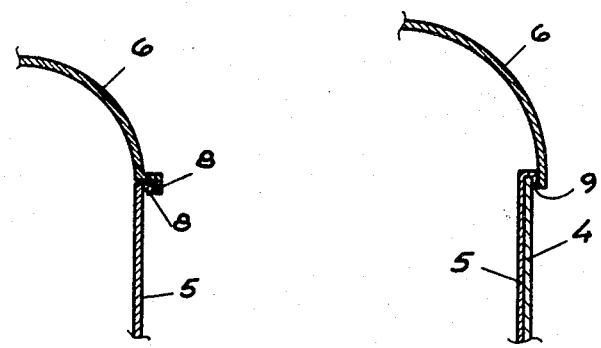
Figure 4:
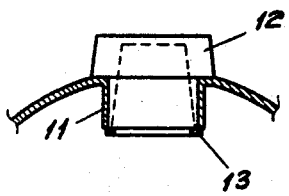
Figure 5:
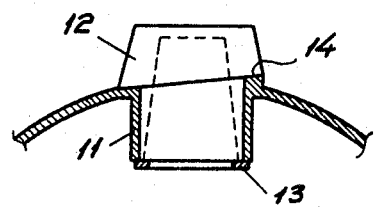

In the following the invention will be described with reference to the accompanying drawing. FIG. 1 illustrates a bottle according to the invention in longitudinal section. FIG. 2 illustrates the container of the bottle composed of two parts, made from plastic. FIG. 2a illustrates a modified form of the joining of these parts. FIG. 2b illustrates another modified form of the joining of these parts. FIG. 3 illustrates the whole bottle in elevation and provided with a cap on the upper end of the container. FIG. 4 is a sectional of a fractional part of the container at the upper end thereof for illustrating a form of cap device suitable for the bottle. FIG. 5 shows, on a larger scale, part of the cap device in a slightly modified form.

Referring to FIG. 1, the bottle shown has as one of its principal parts a container 1 consisting of a cylindrical shell 2 and two bulged, preferably semi-spherical, end walls 3 closing the ends of the shell. The container may be formed as an integral piece from a suitable thermoplastic, e.g. stiff, impact resistant polyvinyl chloride covered with saran or similar impermeable substance on the outside, having substantially uniform wall thickness throughout. This container may be filled with carbonated liquid through a tube member (not shown) which is fused off after the filling operation, and it is opened by piercing it. Placed on the outside of the container 1 is a supporting sleeve 4 fitting closely and securely around the shell 2 thereof, said sleeve at one end (at the top in FIG. 1) reaching only to the end of the shell where one of the bulged end walls 3 begins but at the other end extending slightly beyond the end of the adjacent bulged end wall 3. The supporting sleeve 4 may preferably consist of cardboard or of other stiff and mechanically resistant material which is capable of stiffening the container shell 2, so that it will better withstand both pressure from the inside and shocks and blows from the outside, and which besides permits that the supporting sleeve at the said other end will function as a foot for the bottle. It is apparent that the supporting sleeve 4 may also conveniently serve as a bottle label.

The wall thickness of the container 1 is determined with a view to giving, at the internal overpressures occurring in beer and lemonade bottles, a tensional stress in the budged end walls 3 which does not exceed that permissible for the material. With the tension distribution which prevails in a container of the kind described the peripheral tensional stress in the shell 2 will be twice as great as the tensional stress in the end walls. As a consequence, the shell wall will be a critical zone which is subjected to a greater tensional stress than the maximum permissible, if the tensional stress in the end walls has already reached its maximum permissible value. The supporting sleeve 4, however, functions as a backing which relieves the shell wall from taking up the load and thus enables the shell of the container to be constructed with the same wall thickness as is required in the end walls, whereby the consumption of the relatively expensive plastic material will be a minimum.

A container 1 made as an integral piece according to FIG. 1 is rather difficult to produce at a low cost, and for application in practice the embodiment of FIG. 2 is preferable. In this embodiment the container is composed of two parts 5 and 6, of which one part 5 comprises the whole length of the cylindrical shell and one end wall and the other part 6 comprises the other end wall. These parts may be produced separately by vacuum or pressure moulding, in a manner well-known per se, from thermoplastic sheet material, which may or may not have been covered beforehand with saran. They are joined edge to edge by fusing ("welding") the material preferably by the use of high frequency heating. To obtain a secure joining of the parts they may have been provided at the moulding step with an exterior straight edge flange 7 according to FIG. 2 or alternatively with an exterior angularly bent-down edge flange 8 according to FIG. 2a or the part 5 alone may have been provided with an angularly bent-down edge flange 9 and the end wall part 6 made of a diameter so much greater than that of the said flange 9 that at its edge it closely surrounds the flange 9, as shown in FIG. 2b.

FIG. 3 shows a finished bottle consisting of a container according to FIG. 2 and a supporting sleeve 4, such as is shown in FIG. 1, surrounding the container. The peripheral flange 10 formed on the container by the fusion of the edge flanges 7 engages the top edge of the supporting sleeve and assists in keeping the container in a definite position in relation to the sleeve. In the case where the container has edge flanges 8 according to FIG. 2a, the bent-down portions thereof may cling to the container wall and also engage the top edge of the supporting sleeve. When using tthe embodiment of FIG. 2b the bent-down portion of the edge flange 9 should be spaced from the container wall a distance corresponding to the wall thickness of the sleeve 4, so that the flange 9 extends down over the sleeve, as shown in the figure. Thereby, the edge flange 9 will be better stiffened.

If the container of the bottle is composed of two parts according to FIGS. 2, 2a or 2b it may also be provided with a simple self-sealing cap device in the part 6, e.g. according to FIG. 4. In forming this part 6 an orifice is made in the top thereof surrounded by a collar 11 extending inwards. A plug 12 which fits in the orifice has an annular bead 13 at its inner end in sealing engagement with the inner peripheral edge of the collar 11. The bead 13 is slightly flexible, and the plug 12 may therefore be pressed in through the orifice to close the container and withdrawn again when it is desired to open the container. The withdrawal may, however, involve certain difficulties, and in order to avoid them the cap device may conveniently be of the modified construction illustrated in FIG. 5. The annular surface of the container surrounding the orifice and tthe annular surface of the head of the plug 12 in engagement with the first mentioned annular surface are shown in this figure as oblique sliding planes 14. When the plug is inserted the two sliding planes coincide. By seizing the plug by its preferably knurled head one may turn the plug, the sliding planes 14 occupying different directions of sloping and the plug being forced upwards sufficiently to enable the bead 13 to be drawn into the collar 11 and the plug to be withdrawn from the orifice more easily.

What we claim is:
1. A bottle containing a fluent material under pressure, comprising an inner container made from a flexible and moldable plastic material which is impermeable to the fluent material, said inner container being composed of two parts, one part comprising a cylindrical body and an integral first salient end wall closing one end of said body and the other part comprising a second salient end wall attached to and closing the other end of said body, exterior flange means joining said body and said second end wall along the adjacent peripheral edges thereof, a stiff reinforcing sleeve surrounding the whole length and circumference of said cylindrical body with a close fit to resist expansion of said body due to the pressure of the fluent material, said sleeve abutting with one end against said flange means and extending at the other end beyond said cylindrical body at least as far as the extreme end of said first salient end wall.

2. A bottle as claimed in claim 1, in which said exterior flange means has an angularly bent-down portion snugly surrounding the adjacent end of said cylindrical body, said portion forming a shoulder for the abutment of said sleeve.

3. A bottle as claimed in claim 1, in which said exterior flange means has an angularly bent-down portion surrounding the adjacent end of said cylindrical body in spaced relation, and in which said sleeve has its adjacent end inserted into the space formed by the cylindrical body wall and said bent-down portion and abutting against the bottom of said space.

References Cited

UNITED STATES PATENTS

| | | | |
|---|---|---|---|
| 351,707 | 10/1886 | Muller | 220—69 |
| 1,648,718 | 11/1927 | Buhl | 220—69 |
| 2,152,862 | 4/1939 | Bergerioux | 222—105 |
| 2,294,858 | 9/1942 | Allen | 220—3 X |
| 2,837,245 | 6/1958 | Grebowiec. | |
| 3,042,271 | 7/1962 | Winstead | 222—183 X |
| 3,064,844 | 11/1962 | Hoffmann | 215—46 X |
| 3,142,422 | 7/1964 | Mojonnier | 150—5 X |

FOREIGN PATENTS 320,733  9/1934  Italy.

JOSEPH R. LECLAIR, *Primary Examiner.*

D. F. NORTON, *Assistant Examiner.*